May 28, 1968 G. B. THOMPSON 3,385,977

ELECTRICAL NOISE CIRCUIT

Filed Oct. 14, 1964 2 Sheets-Sheet 1

United States Patent Office 3,385,977
Patented May 28, 1968

3,385,977
ELECTRICAL NOISE CIRCUIT

Gordon B. Thompson, Ottawa, Ontario, Canada, assignor to Northern Electric Company Limited, Montreal, Quebec, Canada Filed Oct. 14, 1964, Ser. No. 403,782
9 Claims. (Cl. 307—93)

ABSTRACT OF THE DISCLOSURE

A circuit comprising a reference conductor and at least a second conductor for supplying current for operating an adjacent apparatus is described in which an impedance is inserted in series with the current supply conductor for isolating one part of the supply conductor from the second part. A detecting means for high frequency tensions is connected between the reference conductor and the second part of the second conductor, which detecting means is connected to an amplifier for supplying current to the second part of the second conductor from the first part of the second conductor in such a sense so as to reduce the high frequency tension detected. This circuit can reduce noise present on the second part of the second conductor or alternatively introduce noise in the case in which a noise voltage source is inserted in series with the detecting means.

This invention relates to electrical interference reducing circuits and has particular reference to a circuit for the reduction of noise in systems employing a common DC power supply.

In telephone systems, large central direct current power supplies are often employed for energizing the separate components and the noise fed into the power supply causes considerable mutual interference. This interference is more acute with the increasing inclusion of large numbers of electronic equipment since in general these are fast acting and they are thus inherently susceptible to high frequency interference.

In the past much has been done to remove the noise which exists between the positive and negative battery conductors but the problem of reducing noise voltages between the battery leads on the one hand and the reference or frame ground of the system on the other does not appear satisfactorily to have been overcome.

It is usual in such a system that one side of the common two wire direct current bulk supply is grounded at one point to the reference ground, but as the wiring progresses through the equipment, inductance, and resistance in the wires and leakage capacitance progressively builds up so that considerable high frequency noise voltages over the range of 50 to 500 kc./s. and higher, with a peak usually around 250 kc./s., due to switching transients can exist between each of the battery leads and the frame ground. Now although capacitative coupling between the battery leads can bring them to a common potential with respect to the high frequency components concerned, in general this will be different from and time varying with respect to that on the frame ground lead. Electronic equipment can be quite sensitive to the high frequency potentials between the grounded side of battery and the reference ground.

The apparently simple solution of using the reference or frame ground as a sink for the potentials occurring on the battery leads is not satisfactory since the impedance of the reference ground lead will allow the high frequency currents to develop alternating potentials in the reference ground. In the limit therefore the only overall improvement will be due to a reduction in the inductance and resistance of the grounded battery lead, by the shunting reference ground current path. The value of the reference ground will then be lost.

It is an object of the present invention to reduce the amplitude of noise tensions or potentials occurring on the battery leads with respect to the reference or frame ground without losing the value of this reference ground.

Figure 1:
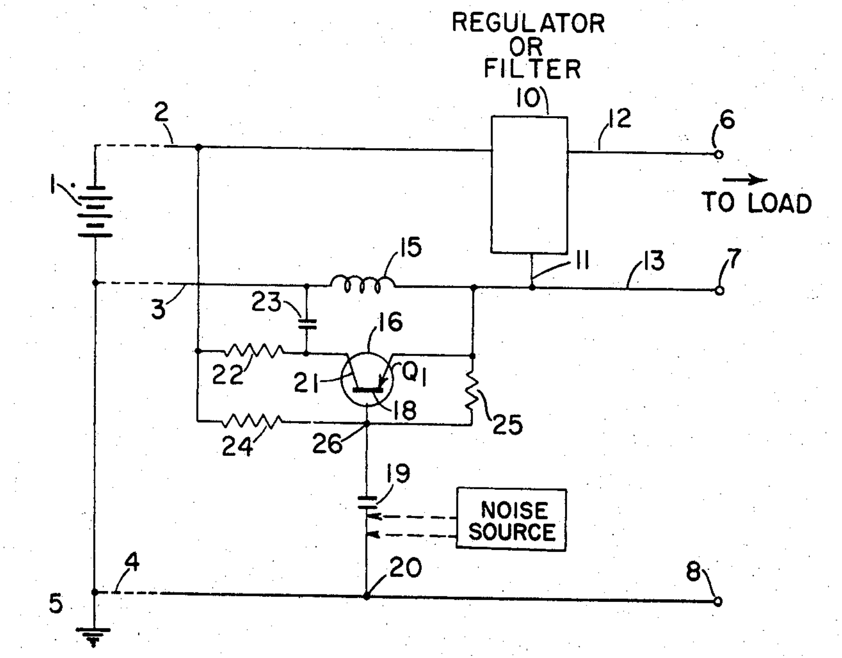
Figure 2:
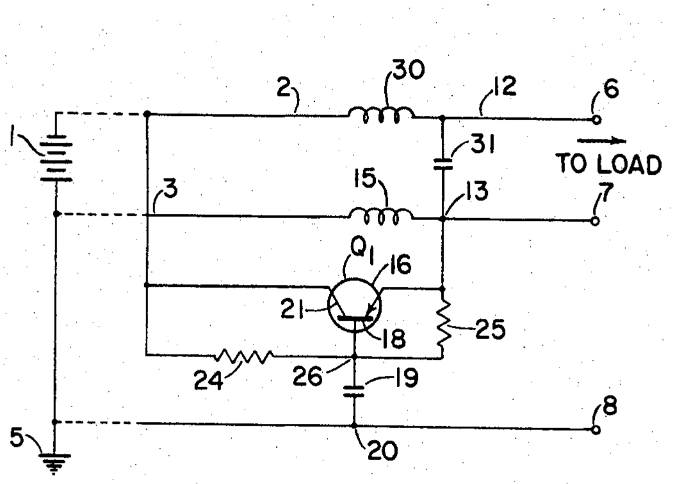
Figure 3:
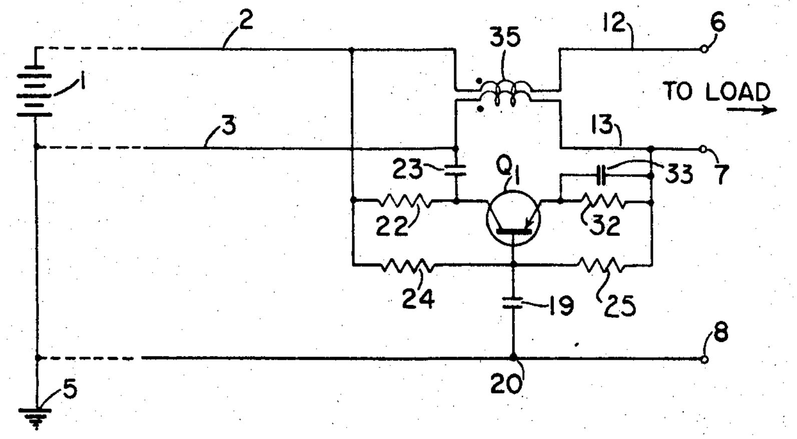
Figure 4:
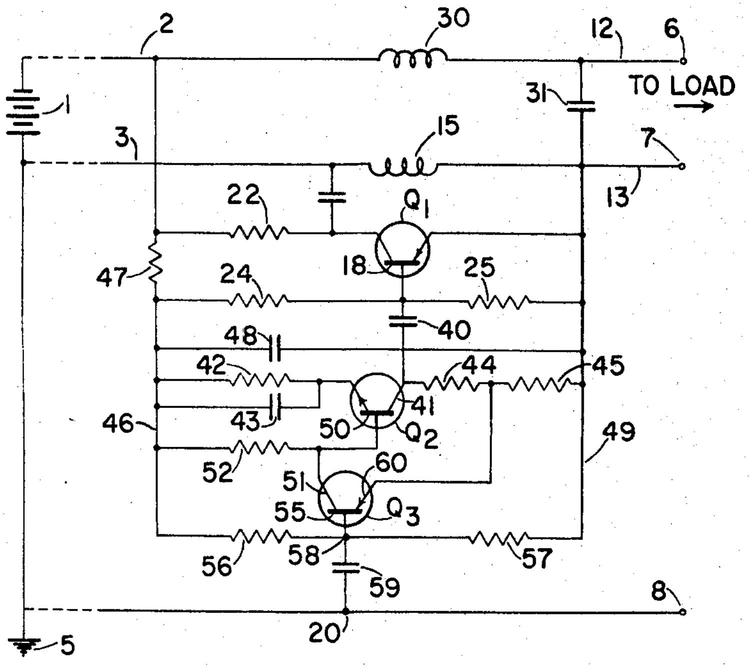

A description of several embodiments of the invention will now be made with reference to the accompanying drawings in which:

FIGURE 1 shows a schematic diagram of a circuit constructed according to the teaching of the invention, FIGURE 2 shows the circuit of FIGURE 1 in which a filter has been shown in detail, FIGURE 3 shows the circuit according to the invention employing a bifilar winding in the battery leads, and FIGURE 4 shows a preferred form of the invention with the addition of amplification for the interference removing circuit.

Having reference now to FIGURE 1 a current source 1 is applied between battery wires 2 and 3. The wire 3 is connected to the frame or reference ground wire 4 at grounding point 5. The wires 2, 3 and 4 then led to equipment distant from the grounding point 5 at terminals 6, 7 and 8 respectively. A filter or voltage regulator represented by a block 10 may be included in lead 2 and being connected at 11 to wire 3 brings terminals 6 and 7 to the same potential for RF interference voltages. The parts of wires 2 and 3 adjacent terminals 6 and 7 are indicated at 12 and 13 respectively.

In one embodiment of the invention an inductance 15 is now interposed in wire 3 adjacent terminal 7 and the emitter 16 of a transistor $Q_1$ is connected to wire 13. The base 18 of transistor $Q_1$ is connected through capacitor 19 to the reference ground adjacent terminal 8 at point 20. The collector 21 of transistor $Q_1$ is connected through load resistor 22 to the battery lead wire 2. Collector 21 is connected to wire 3 through capacitor 23. A potential divider comprising resistors 24 and 25 series connected between wire 2 and wire 13 provides a bias for the base 18 which is connected to junction 26.

Assume now that the potential established at point 26 is such as to bias the transistor $Q_1$ into conducting condition so that it will amplify potentials appearing between its emitter and base. If a high frequency transient is present on wire 12 or 13 with respect to reference ground 20 the transient will be applied directly, if on wire 13, or by virtue of filter or regulator 10, if on wire 12, between emitter 16 and base 18 by means of capacitor 19 so that a current will then be drawn from wire 3 through capacitor 23 of a magnitude determined by the current gain of the transistor amplifier circuit. This current will tend to remove the transient voltage difference between point 20 and wires 12 and 13. Thus the amplifier current gain should be as high as feasible with a voltage gain of unity. The impedance seen at point 26 should be high to avoid drawing current from point 20. Slow variations of potential on wires 12 and 13 with respect to ground are unaffected if they are long compared with the resonant frequency of inductance 15 and capacitor 23. The direct current supply to terminal 7 is carried by the inductance 15. The current rating of the transistor $Q_1$ can therefore be chosen with a view only to the high frequency transient currents which it will carry. The impedance of capacitor 19 is high at low frequencies but negligible at the noise frequencies concerned.

The presence of resistor 22 and capacitor 23 is not essential, and if the bias for transistor $Q_1$ is suitably chosen they may be omitted and collector 21 be connected directly to wire 2. The current drawn through transistor $Q_1$ for neutralizing the transients will be supplied from wire 2 in this instance. In any practical installation there will be filtering not shown which brings wires 2 and 3 to the same RF potential similar to filter 10.

In the embodiment of FIGURE 2 similar parts have been given similar reference numbers to those appearing in FIGURE 1. Here block 10 is exemplified as a filter and wire 2 includes a series inductance 30 shunted across wire 13 by a capacitor 31. Resistor 22 and capacitor 23 have been excluded.

In FIGURE 3 in order to preserve the symmetry to ground of the two battery wires the inductance 15 is replaced by a bifilar wound inductance 35, so that wires 12 and 13 are tightly coupled and it presents an isolating inductive impedance to high frequencies between these wires and their feed wires 2 and 3. A resistor 32 in series with emitter 16 affords current stabilization to prevent any tendency to thermal runaway, and is bypassed for RF by capacitor 33.

In FIGURE 4 a further embodiment of the invention is shown in which the single transistor $Q_1$ is supplemented by an amplifier circuit comprising transistors $Q_2$ and $Q_3$. The amplifier provides higher gain (and greater sensitivity) than can be supplied by the single transistor embodiments. In this circuit the base 18 of transistor $Q_1$ is fed through a capacitor 40 from the collector 41 of transistor $Q_2$. The emitter 48 of transistor $Q_2$ is connected to emitter bias resistor 42 shunted by a decoupling capacitor 43 connected to a wire 46. It is also connected to a collector load comprising resistors 44 and 45 in series joined to a wire 49. The base 50 of transistor $Q_2$ is directly coupled to collector 51 of transistor $Q_3$, which collector is connected through load resistor 52 of wire 46. Bias for base 55 of transistor $Q_3$ is developed by the potential divider comprising resistors 56 and 57 connected between wires 46 and 49, base 55 being connected to the junction point 58. Capacitor 59 is connected between ground reference point 20 and junction point 58. Wire 49 is connected to wire 13 and wire 46 is fed through resistor 47 from wire 2 and is decoupled to wire 49 through capacitor 48.

In operation transient differences which appear between wires 12 and 13 and reference ground are applied between base 55 and emitter 60 of transistor $Q_3$. The emitter base bias of transistors $Q_1$, $Q_2$, and $Q_3$ is such that they are all in current amplifying condition.

The transient signal is amplified by transistor $Q_3$ and applied to base 50 of transistor $Q_2$. The amplified signal appearing at the collector 41 of $Q_2$ across loads 44 and 45 is applied through capacitor 40 to the base 18 of transistor $Q_1$. Inductance 30 and capacitor 31 fulfill the same function as in FIGURE 2 and the current drawn by $Q_1$ is injected onto wires 12 and 13.

This circuit provides a high current gain and an ertremely high impedance at point 58 to currents flowing from point 20. Since collector 41 and emitter 50 have resistor 45 in common the inverse feed back applied to transistor $Q_3$ will help to raise the input impedance presented a 58 and make the circuit very sensitive.

While all the circuits shown can reduce or remove noise tensions or potential differencen present between the battery wires and the reference ground a simple modification for generating noise on otherwise "clean" battery leads can be made. (The introduction of noise onto such leads is useful for test purposes in determining the immunity of an equipment to noise.) In this modification a noise voltage source is inserted between point 20 and caapcitor 19 (in FIGURES 1 to 3) or capacitor 59 (in FIGURE 4).

I claim:

1. In a circuit comprising a reference conductor and a second conductor for current supply intended to be brought to the potential of said reference conductor, impedance means in series with said second conductor for isolating a first part of said second conductor from a second part of said second conductor, high frequency tension detecting means connected between said reference conductor and the second part of said second conductor, and amplifier means connected to said detecting means for supplying current to said second part from said first part in a sense to reduce said detected tension.

2. Apparatus as defined in claim 1 wherein said amplifier means comprises a transistor amplifier circuit, and means for supplying operating power to said transistor amplifier.

3. Apparatus as defined in claim 2, said amplifier means comprising a second amplifier circuit for feeding said transistor circuit, said second amplifier circuit being connected to said operating power supply means.

4. Apparatus as defined in claim 2 comprising a third conductor for current supply, means for connecting a current source between said second and third conductors, said second and third conductors comprising the operating power supply means for said amplifier means.

5. Apparatus as defined in claim 4 comprising high frequency decoupling means for bringing the potential of part of said third conductor to that of said second part of the second conductor, said third conductor part being located adjacent the second part of said second conductor.

6. A noise reducing circuit for a power supply comprising a first power conductor a second power conductor and a reference potential conductor, impedance means in series with at least one of said power conductors, a current amplifier shunting said impedance, means for detecting noise tension difference between said one conductor and said reference conductor and for applying said detected difference as input to said amplifier, and means connecting said amplifier between said two power conductors for energizing current supply to said amplifier, said amplifier diverting current around said impedance of magnitude and in a sense to reduce said tension.

7. Apparatus as defined in claim 6, said impedance comprising a bifilar wound inductance each winging of said inductance being inserted respectively in a chosen one of said first and second power conductors.

8. Apparatus as defined in claim 6 comprising an impedance in the other of said two power conductors and means capacitatively shunting said first and second power conductors at frequencies of said noise tension difference.

9. Apparatus as defined in claim 1 including a noise source series connected with said detecting means between said reference conductor and the second part of said second conductor.

No references cited.

ORIS I. RADER, *Primary Examiner.*

W. E. DUNCANSON, *Assistant Examiner.*